United States Patent Office 3,546,155
Patented Dec. 8, 1970

3,546,155
CATHODIC PROTECTIVE COATINGS OF METAL POWDER AND TITANATE ESTER-ORTHOSILICATE POLYMER BASED VEHICLE
John W. Chandler, Westfalls, N.Y., assignor, by mesne assignments, to Hempel's Marine Paints, Inc., New York, N.Y., a corporation of New York
No Drawing. Original application May 12, 1967, Ser. No. 637,930, now Patent No. 3,442,824, dated May 6, 1969. Divided and this application Sept. 6, 1968, Ser. No. 778,893
Int. Cl. C09d 3/82, 3/84, 5/10
U.S. Cl. 260—37
9 Claims

ABSTRACT OF THE DISCLOSURE

This invention relates to polymeric compositions formed by the interaction of a tetraalkyl titanate ester with low molecular weight polymers resulting from the partial hydrolysis of tetraethyl orthosilicate in acid solutions. These polymer compositions are particularly adapted for use as liquid vehicles to which powdered metal may be added to form protective compositions for application to ferrous surfaces.

CROSS-REFERENCE

This application is a division of S.N. 637,930, filed May 12, 1967, now U.S. Pat. No. 3,442,824, by John W. Chandler.

DESCRIPTION OF THE INVENTION

This invention relates to novel cross-linked polymeric compositions and to novel protective costings containing these polymeric compositions. These novel coatings are particularly adapted to provide cathodic protection for metal surfaces.

Metal surfaces, particularly ferrous surfaces, are well known as being subject to corrosion and much research has been devoted to the development of coatings which will eliminate or else substantially alleviate this problem. One common prior art practice has been to coat ferrous surfaces with paints containing an oxide pigment such as lead oxide, titanium dioxide, etc. Since these pigments are fully oxidized they are not subject to attack by the atmosphere and thus form protective coatings over the metal surfaces to which they had been applied. These paints however, are subject to the major defect that if the paint surface chips, cracks or is broken in any way the underlying metal surface becomes susceptible to atmospheric attack.

A more recent approach to the problem of preventing corrosion of ferrous surfaces has been the application of coatings which provide cathodic protection. These coatings contain a powdered metal which is above iron in the electromotive scale and functions on the principle that in a corrosive environment the corresion will take place first on the metal which is highest in the electromotive series. This cathodic action selectively directs the corrosion to the coating thereby protecting the underlying ferrous metal surface. This protection is effective even when the coating is chipped and some of the underlying metal surface is exposed to the atmosphere.

One of the basic problems in utilizing this type of coating is finding a satisfactory vehicle which will permit the coating to be applied as a paint or by spraying or by any of the other presently utilized commercial methods of application. One such prior art coating is exemplified by Lopata et al. U.S. Pat. No. 3,056,684 which discloses the use of a partially hydrolyzed tetraethyl orthosilicate as a vehicle to which zinc powder can be added to form a paint-like coating material.

It is an object of this invention to prepare cross-linked polymeric compositions.

It is another object of this invention to provide cross-linked polymer compositions to which metal powder may be added to form a composition suitable for coating ferrous surfaces.

It is an object of this invention to provide compositions particularly adapted to be applied to ferrous surfaces as a coating therefor.

It is still another object of this invention to provide a coating material which adheres well to ferrous surfaces and which forms a smooth, dry, hard film over the ferrous surface.

These and other objects will be readily apparent from the following detailed description of the invention.

According to this invention there is provided cross-linked polymeric compositions comprising the reaction product formed by the interaction of a tetra-alkyl titanate ester with lower molecular weight polymers resulting from the partial hydrolysis of tetraethyl orthosilicate in an acidic medium.

The tetra-alkyl titanate esters used as initial reactants in the formation of the polymeric compositions of this invention have the general formula Ti(OR)$_4$ where R is an alkyl group having from 1 to 12 carbon atoms in the alkyl group.

Tetra-alkyl titanate esters which have been found to be particularly suitable for use in preparing these polymeric compositions are tetrakis (2-ethylhexyl) titanate which has the general formula:

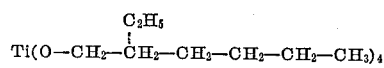

and tetrakis isopropyl titanate which has the general formula

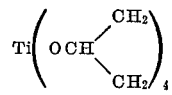

As is well known, tetraethyl orthosilicate has the general formula Si(OC$_2$H$_5$)$_4$ and undergoes partial hydrolysis with water in the presence of an acid to form low molecular weight polymers. In carrying out this reaction, the amount of water employed must be less than the stoichiometric amount based on the weight of the tetraethyl orthosilicate, or else the orthosilicate will be completely hydrolyzed and will not polymerize. Generally it has been found that amounts ranging from about 5 to 35 parts of water by weight, per 100 parts by weight or tetraethyl orthosilicate, may be employed. In carrying out the polymerization reaction, the tetraethyl orthosilicate is dissolved in a suitable carrier such as ethyleneglycol mono-ethylether sold by the Dow Chemical Company under the trade name Dowanol EE, denatured alcohols, polyethylene glycols, etc. The pH of the solution is made acidic by the addition of conventional acids such as hydrochloric acid and is maintained in the range of about 1 to 6. The reaction is exothermic and the temperature continues to rise until all of the solute has been hydrolyzed at which point the temperature remains constant for a period of time and then begins to slowly fall off indicating that the reaction has been concluded. This reaction is generally complete in less than 3 days.

The tetra-alkyl titanate ester is added to the reaction medium after the polymerization reaction of the orthosilicate has been completed. The amount of tetra-alkyl titanate ester that is utilized in the reaction is generally in the range of .1 to 15 percent by weight based upon the weight of the tetraethyl orthosilicate utilized in the reaction. The reaction is generally carried out at room temperature or slightly above room temperature. The reaction proceeds smoothly and generally reaches equilibrium in about 1 to 5 hours. During the reaction the silicate polymer reacts with the titanate to form in equilibrium a titanate-silicate polymer and alcohol. If the alcohol is allowed to escape from the reaction medium, the reaction proceeds to completion and forms a cross-linked titanate-silicate polymer.

At equilibrium a low molecular titanate-silicate polymer is formed which is soluble in ethyleneglycol monoethylether and has a solution viscosity in the range of 1–5 centipoises as measured on a Brookfield viscometer.

The end product formed upon release of the alcohol is a high molecular weight cross-linked titanate-silicate polymer which is insoluble in ethyleneglycol monoethylether and in most solvents.

During the polymerization reaction a gel is formed which is readily observable. As the titanate-silicate polymer forms, the viscosity of the solution undergoes a very slow increase with time. However, as the polymer chain lengthens and the degree of cross-linking increases, the solution viscosity begins to undergo a relatively rapid increase in viscosity with time. This rise in viscosity is reflected by an increase in the viscoelasticity of the solution and it becomes possible to draw increasing longer threads of polymer from the solution. At some point during the reaction, gellation occurs and it is impossible to draw any further threads from the solution. The time required to gellation is inversely proportional to the amount of titanate added.

This reaction may be carried out either in a closed system, or in one open to the atmosphere, or in vacuum. The reaction proceeds smoothly in the atmosphere but care must be taken to control the amount of moisture present, lest the orthosilicate hydrolyze completely. The reaction may be carried out in a closed system but it generally takes a period of days before a point of gellation is reached. In a vacuum where air is excluded but in which volatile by-products of the polymerization are removed, a hard polymer film will develop in about an hour and a half to two hours or slightly longer. A silicate polymer without titanate will not form a film in a comparable period of time under similar reaction conditions.

While not wishing to be bound by any theory as to the mechanism of the reaction or as to the structural formula of the resulting end product, it is believed that the reaction between the tetraethyl orthosilicate and the tetraalkyl titanate ester proceeds as follows to form the crosslink reaction product:

(1)
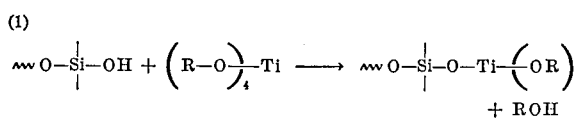
+ ROH (2)
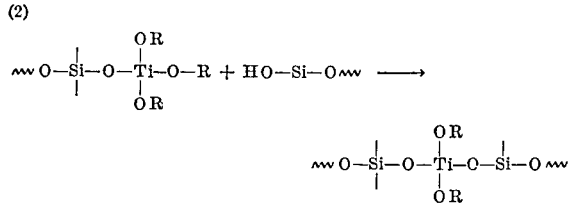

(3)
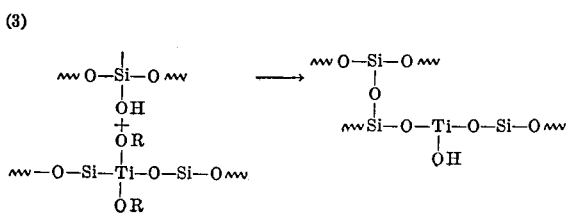

It has been found that the addition of a small amount of trimethyl borate facilitates mixing of the tetraethyl orthosilicate and the titanate ester. It is not known whether the trimethyl borate functions as a catalyst in the reaction or whether it merely has some solvent effect on the titanate ester. Generally an amount of trimethyl borate in the range of about 2 to 4 parts by weight based on the weight of the tetra-alkyl titanate ester has been found to be quite suitable.

When the titanate-silicate polymers are to be employed in coating compositions, the reaction between the titanate and silicate is carried out until the silicate-titanate polymer is in equilibrium with the alcohol formed during the reaction. The reaction conditions are maintained such that the volatile alcohol formed during the reaction is prevented from escaping. This low molecular weight titanate-silicate polymer solution may then be used as a vehicle for metal powders such as zinc having mostly particle sizes in the range of about 1 to 15 microns. For instance, it has been found that the addition of about 16 pounds of powdered zinc to about 5 pounds of the titanate-silicate polymer forms a composition which may be applied to ferrous surfaces by spraying or by brushing. Upon application to the ferrous surface, the alcohol present in the composition evaporates and the reaction goes to completion and forms a high molecular weight crosslink titanate-silicate polymer which firmly adheres to the surface and produces a hard, smooth, dry film.

In preparing coating compositions which are particularly adapted for application to ferrous surfaces, about 1 to 4 parts of metal powdered composition are utilized per part of polymer composition. In addition to the metal powder which comprises the predominant portion of the metal composition, other ingredients such as attaplugus clay, pigments, mica, etc. may be incorporated in the metal composition.

It has been found that titanate-silicate polymers of this invention have many advantages over orthosilicate polymers of the prior art. For example, titanate-silicate polymers of this invention, have faster cures at lower humidities and do not depend on atmospheric moisture for their cure as do the ortho-silicate polymers. In addition the titanate-silicate polymers of this invention have been found to give better uniform adhesion because of their superior wetting properties and permit better dispersion of pigments resulting in smoother films than do the orthosilicate polymers.

The following examples illustrate the invention and obvious modifications may be made without departing from the spirit and scope thereof.

EXAMPLE 1

A solution containing 100 g. of tetraethyl ortho-silicate dissolved in 100 g. of ethyleneglycol monoethylether was prepared, and to this solution was added 11 g. of a dilute aqueous hydrochloric acid solution (6 ml. of 37% aqueous hydrochloric acid per liter of water). The addition of the aqueous acid caused an oxothermic reaction to take place. The resulting pre-polymer solution was allowed to stand for a period of approximately three days to insure that the reaction had reached equilibrium. After this time, 1.1 ml. of trimethyl borate and then 1.0 ml. of tetra-(2-ethylhexyl) titanate were added and the reaction was carried out in an open vessel. Additional polymerization took place and a cured polymer was obtained within one day.

EXAMPLE 2

Following the procedure of Example 1, 5.0 mls. of tetra(2-ethylhexyl) titanate was added and the reaction was carried out in an open vessel. Additional polymerization took place and a cured polymer was obtained within one day.

EXAMPLE 3

Following the procedure of Example 1, 10 mls. of tetra(2-ethylhexyl) titanate was added and the reaction was carried out in an open vessel. Additional polymerization took place and a cured polymer was obtained within one day.

EXAMPLE 4

Following the procedure of Example 1, 15 mls. of tetra-(2-ethylhexyl) titanate was added and the reaction was carried out in an open vessel. Additional polymerization took place and a cured polymer was obtained within one day.

EXAMPLE 5

Following the procedure of Example 1, 20 mls. of tetra-(2-ethylhexyl) titanate was added and the reaction was carried out in an open vessel. The reaction did not give a suitable polymer film.

EXAMPLE 6

This example demonstrates the effect that the addition of incremental amounts of titanate ester has on the rate of polymerization.

To 100 ml. portions of a stock solution of orthosilicate polymer were added the following weighed amounts of tetra alkyl titanate ester (TOT);

| Sample: | Wt: TOT, gm. | TOT mole liter |
|---|---|---|
| 1 | 0.930 | $1.65 \times 10^{-2}$ |
| 2 | 1.859 | 3.39 |
| 3 | 3.705 | 6.59 |
| 4 | 7.413 | 13.15 |

These solutions were mixed and heated in a constant temperature bath at 60.0–60.1° C. The viscosity was recorded at various time intervals, measured from $t$. ($t=$ time of mixing). These results are listed in Table I.

TABLE I

| | $t$(sec.) | $u$(cps.) | | $t$(sec.) | $u$(cps.) |
|---|---|---|---|---|---|
| Sample 1 | 9,600 | 3.8 | Sample 4 | 10,000 | 5.2 |
| | 16,500 | 3.6 | | 15,300 | 6.6 |
| | 19,650 | 4.0 | | 18,700 | 8.0 |
| | 24,700 | 4.2 | | 23,600 | 11.0 |
| | 33,900 | 4.8 | | 31,800 | 24.00 |
| Sample 2 | 9,700 | 4.0 | Sample 5 | 10,200 | 5.4 |
| | 16,000 | 4.6 | | 12,500 | 5.8 |
| | 18,800 | 5.4 | | 14,900 | 7.2 |
| | 24,300 | 6.6 | | 18,300 | 8.2 |
| | 32,600 | 8.6 | | 21,900 | 11.2 |
| | | | | 23,300 | 12.2 |
| Sample 3 | 9,900 | 4.8 | | 26,400 | 17.2 |
| | 15,700 | 5.4 | | 28,700 | 24.0 |
| | 19,100 | 6.4 | | 31,400 | 42.0 |
| | 24,000 | 8.6 | | | |
| | 32,300 | 17.6 | | | |

It is clear from this data that viscosity is a function of the concentration of the tetra-alkyl titanate ester and that as the concentration of the titanate ester is increased the viscosity of the solution increases.

EXAMPLE 7

The following represents a typical formulation of the materials which may be utilized in forming the polymeric compositions of this invention.

| | Parts |
|---|---|
| Tetraethyl orthosilicate | 100 |
| Ethylglycol monoethyl ether | 100 |
| Water | 11 |
| HCL (37%) | .08 |
| Trimethyl borate | 4.22 |
| Tetra (2-ethylhexyl titanate) | 4.30 |

The tetraethyl orthosilicate and the ethylene glycol monoethyl ether are first blended together. The hydrochloric acid and water are then added together and this mixture added to the blend of tetraethyl orthosilicate and solvent. The entire mixture is then allowed to age for about 3 days at room temperature in order to permit the orthosilicate to partially hydrolyze. The tetramethyl borate and tetra (2-ethylhexyl titanate) are then added to the polymeric orthosilicate solution and the reaction is allowed to proceed until equilibrium is reached.

A zinc powder composition having the following typical formula is then slowly added to the titanate-silicate polymer solution with agitation.

| | Parts |
|---|---|
| Zinc dust | 87 |
| Silicon dioxide | 3 |
| Clay thickening agent | 2 |
| Mica-graphite | 4.5 |
| Pigment | 1 |
| Asbestos fibers | 2.5 |

After agitation the composition is applied to ferrous surfaces as a protective coating.

EXAMPLE 8

In order to demonstrate the difference in properties between the titanate-silicate polymeric compositions of this invention and orthosilicate polymers, the following experiment was carried out. Two compositions were prepared.

Composition A, which is a composition of this invention, was prepared as follows:

A blend of zinc powder was mixed at a ratio of 3.3 parts by weight of zinc powder to 1 part by weight of a partially hydrolyzed titanium ethyl silicate solution containing a small percentage of tri-methyl borate. The mixture was mechanically blended for 10 minutes.

Composition B which is a silicate composition was prepared as follows:

A blend of zinc powder from the same identical batch as that used in Composition A, was mixed at a ratio of 3.3 parts by weight of zinc powder to 1 part by weight of partially hydrolyzed ethyl silicate solution. The mixture was mechanically blended for 10 minutes.

Both compositions were then observed for uniformity of mixture, viscosity and settling of solids. The following results were obtained.

| | Composition A | Composition B |
|---|---|---|
| Uniformity of mixture | Excellent | Green pigment quickly floats to top of mixture. |
| Viscosity | 250 cps | 210 cps. |
| Settling of solids (30 minutes) | Very little, approx. 5% | Considerable, approx. 40%. |

It is evident from these results that Composition B had poor dispersion as indicated by the green pigment floating to the top of the composition. The higher viscosity of composition A indicates better body of the mixture. The settling of solids in Composition B is a disadvantage because during application of the material to a surface, constant agitation is necessary to assure deposit of proper solid content in the film.

EXAMPLE 9

A steel sandblasted panel 6" x 2½" was sprayed with Composition A of Example 8. An identical panel was sprayed with Composition B of Example 8. Upon spraying each panel was placed in a refrigerator and a temperature of 35° F. maintained with a relative humidity of 50%. Temperature and humidity were checked with thermometer and humidity gauge.

The panels were checked for sprayability, mud cracking, color, cure and hardness. The test results for each of these properties was as follows:

|  | Panel Coated with Composition A | Panel Coated with Composition B |
|---|---|---|
| Sprayability | Excellent with 8 mils applied and no sagging. | Excellent, however at 6 mils coating sagged. |
| Mud cracking | No visible signs of mud cracking at 8 mils. | Visible signs of mud cracking at 6 mils. |
| Color | Excellent uniform pale green color. | Deep gray with a slight green cast. |
| Cure (35° F. RH 50%) | Tack free in 60 min. Hard in 9 hours. After 24 hours cure accelerated fast and no visible mud cracks at 7 to 8 mils. | Tack free in 45 min. Hard in 6 hours. Hard but softer than "A" with mud cracks increasing. Film showed cure continuing at slower rate than "A". |
| Knife test | Film hard and difficult to remove. | Film was easily dug into. |

The test results indicated that Composition A showed better wetting properties than Composition B and did not have film sagging at the same film thickness as Composition B which sagged badly. The difference in color between the panel coated with Composition A and that coated with Composition B indicated that Composition A was a much superior dispersion. The mud cracking of Composition B at lesser film thickness was visible to the eye. When such cracking occurs, the application must be removed and the surface recoated. While Composition A was slower to dry hard at low temperatures, it reached its cure within 24 hours. Composition B on the other hand had a film that was brittle and still curing as indicated by the knife test.

Having thus provided a written abstract and description of the invention and provided specific examples thereof, it should be understood that no undue restrictions or limitations are to be imposed by reason thereof but that the present invention is defined by the appended claims.

What is claimed is:

1. Coating compositions adapted to provide cathodic protective coatings comprising metal powder dispersed in a vehicle comprising the polymer compositions of the reaction products formed by the substantially complete interaction of a tetra-alkyl titanate ester with lower molecular weight polymers resulting from the partial hydrolysis of tetraethyl orthosilicate in an aqueous acidic medium with an amount of water which is less than the stoichiometric amount based on the weight of said silicate.

2. The composition of claim 1 comprising about 1 to 4 parts of metal powder per part of said polymer composition.

3. The composition of claim 1 wherein said metal powder is zinc.

4. The coating of claim 1 wherein said polymer composition is the reaction product formed by the substantially complete interaction of tetraalkyl titanate esters having the general formula $Ti(OR)_4$ wherein R is an alkyl group having from 1 to 12 carbon atoms, with lower molecular weight polymers resulting from the partial hydrolysis of tetraethyl orthosilicate in an aqueous acidic medium with an amount of water which is less than the stoichiometric amount based on the weight of said silicate.

5. The coating of claim 1 wherein said polymer composition is the reaction product formed by the substantially complete interaction of tetrakis ethylhexyl titanate with lower molecular weight polymers resulting from the partial hydrolysis of tetraethyl orthosilicate in an aqueous acidic medium with an amount of water which is less than the stoichiometric amount based on the weight of said silicate.

6. The coating of claim 1 wherein said polymer composition is the reaction product formed by the substantially complete interaction of tetrakis isopropyl titanate with lower molecular weight polymers resulting from the partial hydrolysis of tetraethyl orthosilicate in an aqueous medium with an amount of water which is less than the stoichiometric amount based on the weight of said silicate.

7. Coating compositions adapted to protect ferrous surfaces from oxidation comprising zinc powder, fillers, and pigments dispersed in a vehicle comprising the polymer compositions of the reaction products formed by the substantially complete interaction of a tetra-alkyl titanate ester with lower molecular weight polymers resulting from the partial hydrolysis of tetraethyl orthosilicate in an aqueous acidic medium with an amount of water which is less than the stoichiometric amount based on the weight of said silicate.

8. The coating of claim 7 wherein said polymer compositions contain a minor proportion of trimethyl borate.

9. A method of protecting ferrous surfaces from oxidation which comprises applying to said surface a coating of a composition comprising powdered zinc dispersed in a vehicle comprising the equilibrium reaction products formed from the interaction of a tetra-alkyl titanate ester with lower molecular weight polymers resulting from the partial hydrolysis of tetraethyl orthosilicate in an aqueous acidic medium with an amount of water which is less than the stoichiometric amount based on the weight of said silicate.

References Cited

UNITED STATES PATENTS 3,056,684   10/1962   Lopata et al. _____ 106—14

JULIUS FROME, Primary Examiner

A. H. KOECKERT, Assistant Examiner

U.S. Cl. X.R.

260—33.2, 33.4